(12) United States Patent
Patankar et al.

(10) Patent No.: US 9,652,204 B2
(45) Date of Patent: May 16, 2017

(54) DYNAMICALLY RECONFIGURABLE CODE EXECUTION ARCHITECTURE FOR BUILDING DIAGNOSTIC ALGORITHMS

(75) Inventors: Ravindra Patankar, Phoenix, AZ (US); Shreyas Iyer, Phoenix, AZ (US); Sravan Rachamalla, Andhra Pradesh (IN); Murali Kadeppagari, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1344 days.

(21) Appl. No.: 13/280,169

(22) Filed: Oct. 24, 2011

(65) Prior Publication Data
US 2013/0103250 A1   Apr. 25, 2013

(51) Int. Cl.
*G06F 17/00* (2006.01)
*G06F 9/44* (2006.01)
*G06F 11/36* (2006.01)

(52) U.S. Cl.
CPC ............ *G06F 8/36* (2013.01); *G06F 11/3604* (2013.01); *G06F 2212/173* (2013.01)

(58) Field of Classification Search
USPC ....................................................... 701/29.1
See application file for complete search history.

(56) References Cited

U.S. PATENT DOCUMENTS

| 6,236,917 B1 * | 5/2001 | Liebl et al. ................... 701/32.8 |
| 2006/0178791 A1 * | 8/2006 | Fountain et al. ............... 701/31 |
| 2007/0022028 A1 * | 1/2007 | Wulfert et al. ................. 705/35 |
| 2007/0198971 A1 | 8/2007 | Dasu et al. |
| 2013/0179129 A1 * | 7/2013 | Patankar et al. .................. 703/2 |

OTHER PUBLICATIONS

EP Examination Report for Application 12188171.8, Dated Jul. 24, 2014.
Talevski et al., "A Reconfigurable Component-Based Software Framework." Computer Science and Technology, 2003; pp. 84-89.
Elms, "Debugging Optimized Code Using Function Interpretation." Programming Language and Systems Group, pp. 1-10.
EP Search Report for Application 12188171.8, Dated Jul. 11, 2014.

\* cited by examiner

*Primary Examiner* — Shelley Chen
(74) *Attorney, Agent, or Firm* — Lorenz & Kopf, LLP

(57) ABSTRACT

Methods and apparatus are provided for building and executing reconfigurable algorithms in on-board environments which require pre-certification of the compiled code, such as avionics, flight control, and military applications. The code execution architecture includes a library of reusable function modules in the form of pre-compiled code blocks; an algorithm execution utility (AEU) for processing a user-assembled string of code blocks; and a customer interface for selecting code blocks, defining their associated parameters and sequence (execution order), structuring inputs and outputs, and for providing the integrated, machine readable application to the AEU at run time. The various sequences, permutations and combinations of functions and their associated parameters, inputs and outputs are pre-approved or certified a priori; consequently, the on-board reconfiguration and execution of complex algorithms may be performed in real time without the need for recoding, verification, or redeployment of the code base.

9 Claims, 4 Drawing Sheets

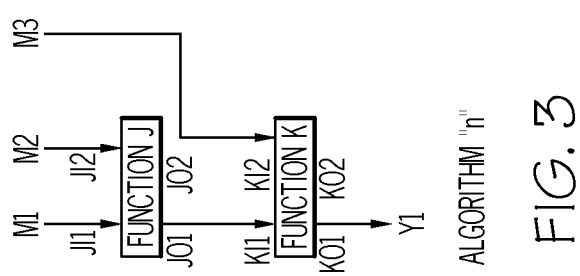
FIG. 3
FIG. 4A
FIG. 4B

DYNAMICALLY RECONFIGURABLE CODE EXECUTION ARCHITECTURE FOR BUILDING DIAGNOSTIC ALGORITHMS

TECHNICAL FIELD

The present invention relates, generally, to computer based systems for building and executing diagnostic algorithms in environments requiring certification or pre-approval of the algorithm code base, such as avionics, on-board flight control systems, and military applications. More particularly, the invention relates to a modular code execution architecture which is dynamically reconfigurable in the field without the need for re-certification and re-deployment of the code base.

BACKGROUND

Several powerful analyses tools and architectures are currently available in the industry, such as Matlab from Mathworks.com and RapidMiner from Rapidminer.com. Specific architectures have also been developed for particular types of data analyses, such as Honeywell's IMDS (Integrated Mechanical Diagnostic System) which facilitates analyses related to off-board, condition based maintenance (CBM) programs. These systems monitor critical engine and drive train components, electronic, mechanical, pneumatic, and hydraulic controls, and fatigue life limited structures.

A key characteristic of these diagnostic systems surrounds their modularity; that is, their underlying code base is composed of separate (discrete) functional modules or blocks of code which, when properly combined at run time, work together as a single, integrated application. This avoids the need for developers to rewrite code for repetitive or recurring functions, such as reading temperature, sensing rotor or driveshaft speed (rpms), sampling airspeed, or the like.

The ability to reconfigure these tools is particularly useful in off board analyses. In an off board context, the user has time to "try out" various analytical approaches and algorithmic configurations, and often has access to previously captured or recorded data streams. Thus, the user can add, remove, substitute, or augment the various functional modules that make up an application with one or more additional modules, and to reconfigure the inputs to and outputs from the modules (e.g. engine temperature) to redefine the overall functionality of the application. When the reconfigured modules are recombined, the revised application—with its newly defined functionality—is recompiled and executed at run time.

Conversely, the reconfigurability of on board systems, such as flight control and diagnostic software, has not received much attention. This is primarily because once a product designed for on board deployment is proven to work in its intended environment, i.e. it has been tested and verified, there is little incentive to change the product after deployment. It can be expensive and cumbersome to re-code, retest, verify, recompile, and re-deploy the code base. This is particularly true when the underlying software is subject to certification or pre-approval, such as flight control, avionics, IMDS, and government and military applications. Moreover, in certain applications accessing the code is impractical, such as when a ship is out to sea on an extended mission or its location is secret.

Accordingly, it is desirable to provide on board diagnostic systems which overcome the foregoing limitations. Furthermore, other desirable features and characteristics of the present invention will become apparent from the subsequent detailed description of the invention and the appended claims, taken in conjunction with the accompanying drawings and this background of the invention.

BRIEF SUMMARY

On board systems and methods are provided for building and executing diagnostic algorithms of the type requiring pre-certification or pre-approval of the compiled code prior to deployment. The system includes a library of function modules in the form of reusable code blocks, and a processing unit, or algorithm execution utility (AEU), for processing a user assembled string of functions. The system further includes user interface hardware for selecting a set of functions, defining their execution sequence, parameters, inputs, and outputs, and assembling them into a machine readable application which can be fed to the AEU for execution.

Methods are provided for dynamically configuring algorithms in an on board system which requires certification or approval of the algorithm code base prior to or at the time of deployment. The method includes providing a library of functions and an AEU for executing a string of functions assembled as an algorithm; selecting the string of functions from the library (where one or more of the functions may have an associated parameter having a selectable value); defining the value(s) of any parameters and the sequence for executing the selected functions; structuring inputs and outputs for the string of functions; assembling the function modules, parameter value, indicia of the execution order of the function modules, and the inputs and outputs into a loadable image, referred to herein as a loadable Integrated Reference Model (IRM); and providing the IRM to the AEU for run time execution. The IRM may be a compact, binary file containing data from a database which allows for very fast access at run time, rather than accessing the database directly at run time.

BRIEF DESCRIPTION OF THE DRAWINGS

The present invention will hereinafter be described in conjunction with the following drawing figures, wherein like numerals denote like elements.

FIG. 3 is a schematic flow diagram illustrating the equation (y=ax+b) for the specification sheet shown in FIG. 4;

FIG. 4A is a table illustrating a specification sheet for the equation implemented by the algorithm shown in FIG. 3 according to a preferred embodiment;

FIG. 4B is a tabular legend for the specification sheet shown in FIG. 4A.

DETAILED DESCRIPTION

Figure 1:
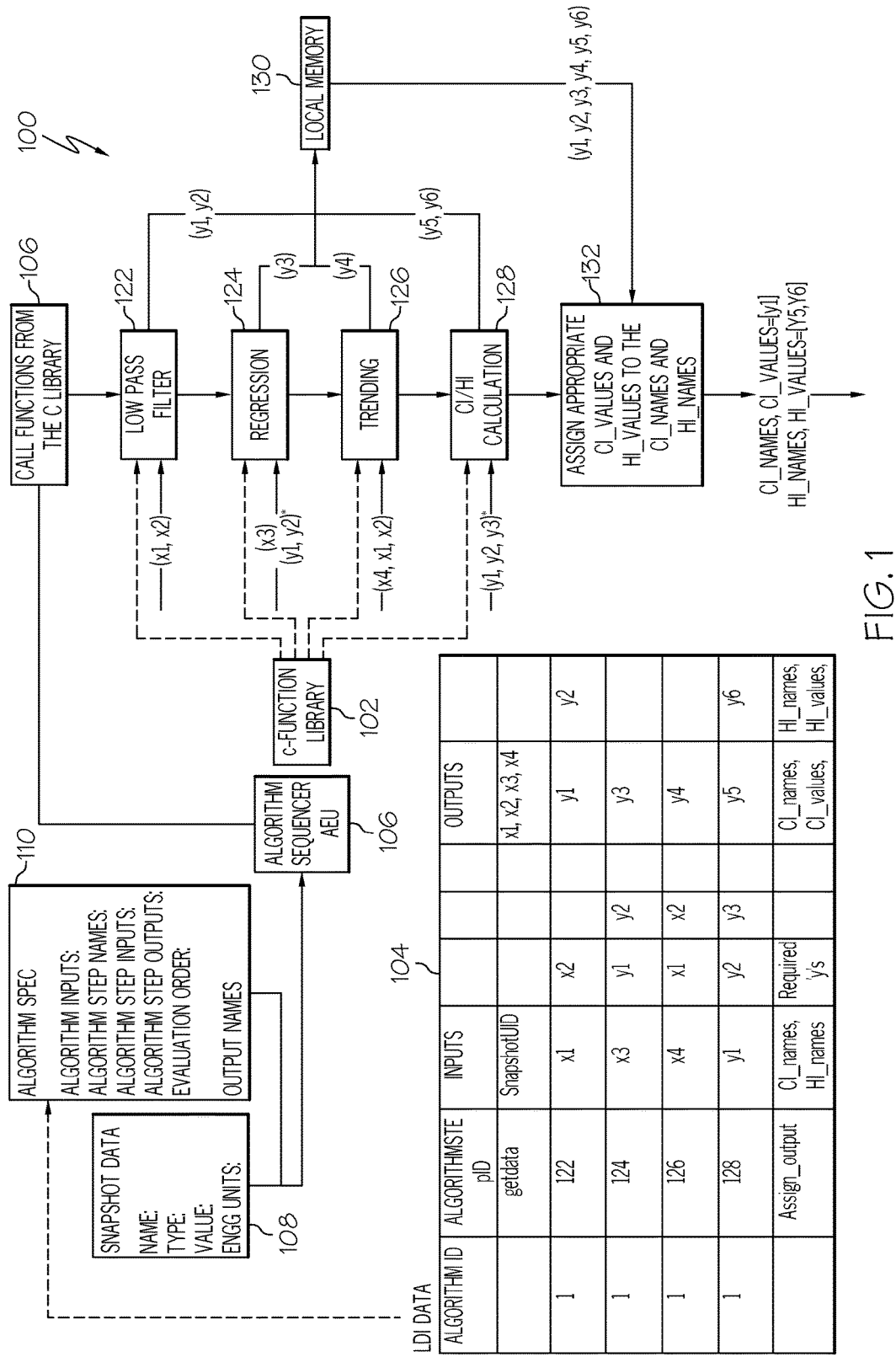
FIG. 1 is a block diagram of an exemplary code execution architecture for building diagnostic algorithms in accordance with the subject matter described herein.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration."

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

In one embodiment, the system for building diagnostic algorithms is implemented in an aircraft. In other embodiments, the system may be implemented in a land, marine, or amphibious vehicle.

Referring now to FIG. 1, an architecture 100 for building reconfigurable diagnostic algorithms includes a function library 102, a loadable diagnostic image (also referred to as an Integrated Reference Model (IRM)) 104, and an Algorithm Execution Unit (AEU) 106.

In accordance with a preferred embodiment, function library 102 includes a plurality of reusable, functional modules in the form of discrete blocks of compiled code; that is, they are stored in machine readable format to minimize compiling errors at run time. In this way, the modules may be certified or pre-approved prior to their inclusion in the library. This is particularly important in aviation, government, and military applications where software and other product components must undergo testing and/or verification by an oversight authority such as the Federal Aviation Administration (FAA), National Transportation Safety Board (NTSB), Department of Transportation (DOT), Department of Defense (DOD), or other regulatory agency.

The functional modules in library 102 may be simple or complex, and may operate on scalar, vector, or combinatorial inputs. Functions may range from simple "add", "subtract", "multiply", or "divide" functions, to more complex trending, regression, fast Fourier transform (FFT), and hierarchical and customizable tasks. Other functions may include analog and digital functions representing low, high, and band pass filters, prognostic and predictive functions, and the like.

The various functions may also have one or associated parameters which may be defined by the user. For example, the function "low pass filter" may have an associated parameter "filter order" which the user may define to be a first, second, or third order filter. The "low pass filter" function may also have an associated parameter which allows the user to define filter coefficients, for example. The various functions and their associated parameters in library 102 are a priori known and complied as machine readable code prior to inclusion in the library.

Function library 102, IRM 104, and AEU 106 cooperate to implement a reconfigurable, on board, code execution architecture. AEU 106, by itself, does not "know" which functions to execute, in what order, or how to assign inputs, outputs, and parameters when constructing an algorithm. For this purpose, a user interface (not shown) may be provided including input/output hardware such as a human readable display, keyboard, mouse, toggle, or the like for facilitating user interaction with system architecture 100 to thereby allow the operator to configure the algorithms for execution by AEU 106.

With continued reference to FIG. 1, an exemplary IRM 104 is illustrated as a data sheet which includes identifies a particular algorithm (e.g., algorithm 1), the various functions included in the algorithm, and any inputs, outputs, and parameters associated with the algorithm. In the example shown in FIG. 1, the following functions are included in the algorithm: a low pass filter 122, a regression module 124, a trending module 126, and a calculation module 128.

Before execution the algorithm, "snapshot" data 108 is captured. These data may include, for example, sensed or target values of various parameters such as temperature, speed, and the like. Snapshot data 108 and IRM data 104 are provided to AEU 106, whereupon AEU 106 calls the designated functions from library 102, and executes the algorithm. A local memory 130 may be used for the temporary storage of data and other values and parameters, as needed. AEU 106 provides appropriate output values 132 in accordance with the outputs defined in IRM 104.

Figure 2:
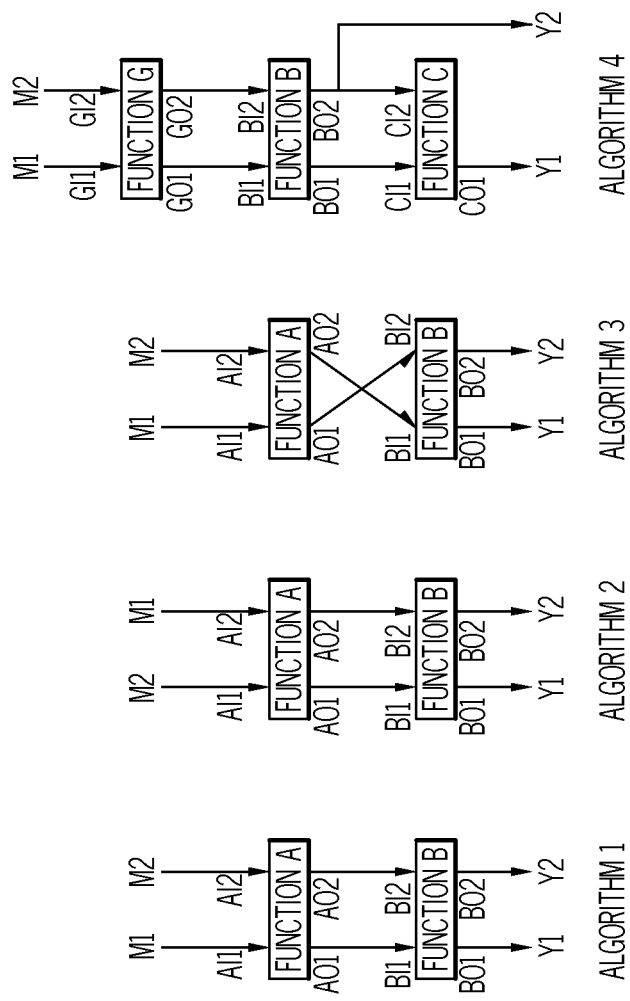
FIG. 2 illustrates four schematic flow diagrams, each representing an algorithm configured in accordance with exemplary embodiments of the subject matter described herein.

Referring now to FIG. 2, four different exemplary algorithms (algorithms 1-4) are shown operating on respective inputs M1 and M2 to produce respective outputs Y1 and Y2. More particularly, Algorithm 1 illustrates a string of two functions, namely, Function A and Function B, selected from function library 102. Function A has input ports AI1 and AI2 and output ports AO1 and AO2. Similarly, Function B has input ports BI1 and BI2, and output ports BO1 and BO2. Algorithm 1 has been configured such that input M1 is applied to input port AI1 of Function A, and input M2 is applied to input port AI2 of Function A. Algorithm 1 is also configured such that output Y1 is output from port BO1 of Function B, and output Y2 is produced by output port BO2 of Function B.

With continued reference to FIG. 2, Algorithm 2 is similar to Algorithm 1 except that the external inputs are switched; that is, in Algorithm 2 input M2 is applied to input port AI1 of Function A, and input M1 is applied to input port AI2 of Function A. Hence, the two algorithms (namely, Algorithm 1 and Algorithm 2) will produce different outputs. This highlights the dynamic reconfigurability of system 100 in that Algorithm 2 may be constructed from Algorithm 1 by simply switching inputs M1 and M2 from respective input ports AI1 and AI2, in the first instance (Algorithm 1), to respective input ports AI2 and AI1 in the second instance (Algorithm 2). This also highlights the ease by which the user may construct a new, stand alone algorithm from a previous algorithm.

In an analogous manner, Algorithm 3 may be conveniently constructed by reconfiguring Algorithm 1 to apply the output from port AO1 to port BI2 (instead of port BI1), and to apply the output from port AO2 to port BI1 (rather than port BI2). Similarly, Algorithm 4 may be constructed from Algorithm 1 in the following manner: substituting Function G for Function A; appending Function C to Function B; and applying the outputs of Function B to the input ports of Function C.

Referring now to FIGS. 3 and 4, a block flow diagram and associated specification sheet are set forth for implementing the algorithm "y=ax+b". With particular reference to FIG. 3, Functions J and K are selected from library 102 and strung together to build an exemplary Algorithm "n". In the illustrated example, Function J represents the mathematical operator "Multiply" and is assigned evaluation order number one. Function K represents the mathematical operator "Add" and is assigned evaluation order number two. Inputs M1 and M2 are applied to input ports JI1 and JI2, respectively, of Function J. Output port JO1 of Function J is connected to input port KI1 of Function K (to thereby apply the output from port JO1 to port KI1), and input M3 is applied to input port KI2 of Function K.

With continued reference to FIGS. 3 and 4, parameters "a" and "x" are assigned to inputs M1 and M2, respectively, and parameter "b" is assigned to input M3. When the specification sheet shown in FIG. 4A is applied to AEU 106 at run time, Algorithm "n" produces the value (parameter) "y", assigned to output Y1, in the equation "y=ax+b" as follows: i) Function J is initially executed to multiply input M1 by input M2 to yield the product "ax" identified as variable "temp"; ii) Function K is then executed to add input M3 ("b") to the value "temp" ("ax"); and iii) the sum "ax+b" is output from Function K, expressed as variable "y"; and iv) the variable "temp" is discarded at the end of execution since it is not used.

Figure 5:
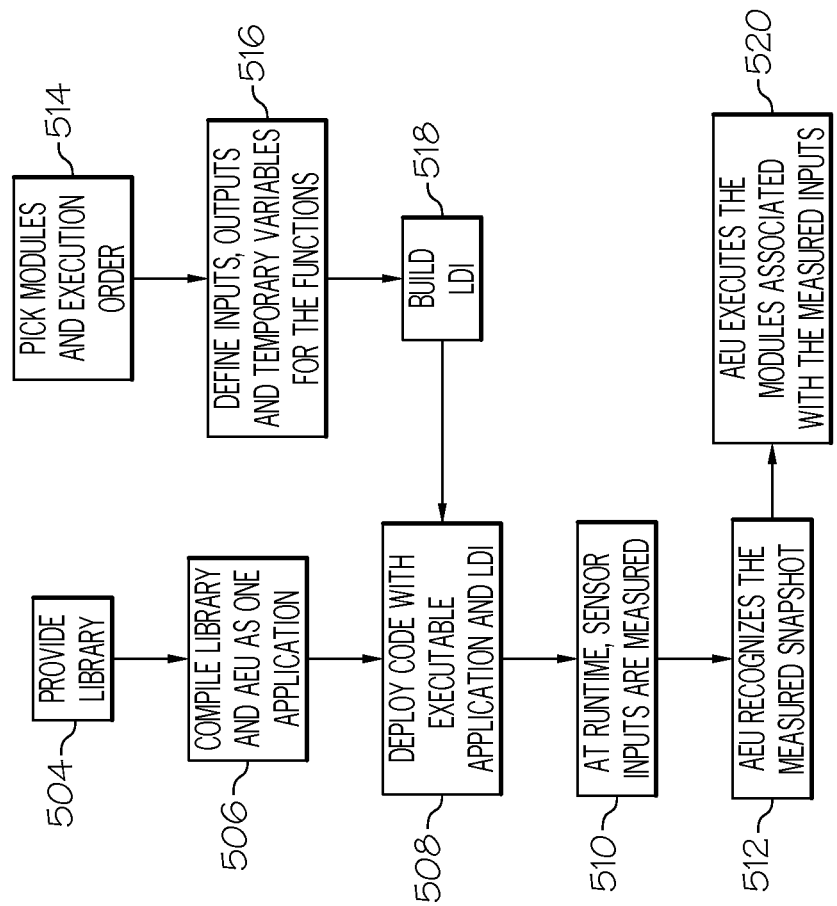
FIG. 5 is a flow chart illustrating a method for building and executing diagnostic algorithms in accordance with a preferred embodiment.

Referring to FIG. 5, a method 500 for building and executing diagnostic algorithms in accordance with an embodiment includes providing a library of function modules (task 504), and compiling the library and Algorithm Execution Unit (AEU) 106 as one application (task 506). The code base, including the executable application and its associated IRM 104, may then be deployed (task 508). At runtime, snapshot data 108 are measured (task 510) and recognized by AEU 106 (task 512).

With continued reference to FIG. 5, it will be appreciated that prior to code deployment, the function modules and their execution order are selected by the operator (task 514) as discussed above. In similar fashion, the operator defines the inputs, outputs, and any temporary variables for the functions, as needed (task 516). This information is used to construct IRM 104 (task 518). AEU 106 then executes the modules associated with the measured inputs (task 520).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A computer based system on-board a vehicle for dynamically building and executing diagnostic algorithms using a pre-certified code base, the system comprising:

a source of sensor data associated with the vehicle that includes at least one measured value associated with the vehicle;

a library of function modules in the form of reusable pre-compiled code blocks which have been previously tested and certified by a certification authority, the reusable pre-compiled code blocks stored in the library in a machine readable format and at least one of the code blocks has an associated parameter having a user-selectable temporary value;

a computer processor on-board the vehicle for executing the diagnostic algorithms in the form of a user assembled string of the code blocks at run time; and a user interface device on-board the vehicle including a human readable display and input hardware for facilitating interaction between the user and the system to thereby:

receive a selected subset of the code blocks from the library and receive input to configure the subset into the user assembled string;

receive input to define the user-selectable temporary value of the associated parameter; and receive input that allocates inputs to and outputs from at least one of the subset of code blocks, an integrated reference model constructed by a processor based on the subset of code blocks, the defined user-selectable temporary value of the associated parameter and the allocation of the inputs to and the outputs from the at least one of the subset of code blocks, the integrated reference model includes a data sheet that provides an order of execution of the subset of code blocks, and for at least one of the subset of code blocks listed in the data sheet, the data sheet includes:

the allocated inputs to and the outputs from the at least one of the subset of code blocks;

the at least one measured value from the sensor data associated with the at least one of the subset of code blocks; and the user-selectable temporary value associated with the at least one of the subset of code blocks, the integrated reference model is provided by the processor to the computer processor for executing the diagnostic algorithms on-board the vehicle in the order of execution listed in the data sheet, and at run time, the computer processor receives as input the at least one measured value from the sensor data based on the integrated reference model, executes the subset of code blocks based on the sensor data and the integrated reference model, and generates output values that correspond with the outputs defined in the integrated reference model.

2. The system of claim 1, wherein said function modules are pre-certified for use in at least one of avionics, flight control, and military applications.

3. The system of claim 1, wherein said system is further configured for executing prognostic algorithms.

4. The system of claim 1, wherein said function modules comprise algebraic functions.

5. The system of claim 1, wherein said system is implemented in a vehicle.

6. The system of claim 5, wherein said vehicle is an aircraft.

7. The system of claim 5, wherein said vehicle is a marine vehicle.

8. The system of claim 5, wherein said vehicle is a land vehicle.

9. The system of claim 5, wherein said vehicle is amphibious.

* * * * *